United States Patent
Chung et al.

(10) Patent No.: US 8,046,665 B2
(45) Date of Patent: Oct. 25, 2011

(54) MEMORY DEVICE EMPLOYING DUAL CLOCKING FOR GENERATING SYSTEMATIC CODE AND METHOD THEREOF

(75) Inventors: Hoe-ju Chung, Yongin-si (KR); Youn-Cheul Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 979 days.

(21) Appl. No.: 12/000,837

(22) Filed: Dec. 18, 2007

(65) Prior Publication Data
US 2008/0162833 A1 Jul. 3, 2008

(30) Foreign Application Priority Data
Dec. 29, 2006 (KR) .................. 10-2006-0138776

(51) Int. Cl.
*G11C 29/00* (2006.01)
(52) U.S. Cl. ............... 714/767; 714/758; 711/154
(58) Field of Classification Search .......... 365/222, 365/230.03; 370/350; 375/371; 714/767, 714/758; 711/154
See application file for complete search history.

(56) References Cited

U.S. PATENT DOCUMENTS

| | | | |
|---|---|---|---|
| 5,056,089 A | 10/1991 | Furuta et al. | |
| 7,088,632 B2 * | 8/2006 | Pelley | 365/222 |
| 7,221,613 B2 * | 5/2007 | Pelley et al. | 365/230.03 |
| 7,480,282 B2 * | 1/2009 | Clune et al. | 370/350 |
| 7,656,983 B2 * | 2/2010 | Klowden et al. | 375/371 |

FOREIGN PATENT DOCUMENTS
JP 61-278100 12/1986
KR 1020030080587 A 10/2003
* cited by examiner

*Primary Examiner* — David Ton
(74) *Attorney, Agent, or Firm* — Harness, Dickey & Pierce, P.L.C.

(57) ABSTRACT

A memory device may include a memory core block, a data patch unit, a Cyclic Redundancy Check (CRC) generating unit, and/or a serializer. The data patch unit may be configured to patch parallel data read from the memory core block in response to a first read pulse. The CRC generating unit may be configured to generate the CRC code based on the parallel data in response to a second read pulse, the second read pulse delayed by a period of time from if the first read pulse is generated. The serializer may be configured to convert the parallel data to serial data in response to the first read pulse, and/or arrange the CRC code in a order for a number of bits of the serial data to generate a systematic code.

22 Claims, 2 Drawing Sheets

US 8,046,665 B2

MEMORY DEVICE EMPLOYING DUAL CLOCKING FOR GENERATING SYSTEMATIC CODE AND METHOD THEREOF

PRIORITY STATEMENT

This application claims the benefit of priority to Korean Patent Application No. 10-2006-0138776, filed on Dec. 29, 2006, in the Korean Intellectual Property Office, the entire contents of which are incorporated herein in their entirety by reference.

BACKGROUND

1. Field

Example embodiments relate to a semiconductor memory device and/or a method thereof, and for example, to a memory device employing dual clocking for outputting a systematic code and/or a method thereof.

2. Description of Related Art

In digital data transfer systems, detecting and correcting bit errors caused during transmission without requiring retransmission of data which contains errors is preferable. In conventional error correction systems, a transmitter generates a code in which certain redundant check bits are added to original data that is to be transmitted.

In a channel coding theory, a systematic code including original data and redundant parity bits associated with the original data is defined.

As the operating speeds of semiconductor memory devices increase, a channel bit error rate (BER) increases. Accordingly, a technique for detecting and correcting channel errors is required. Accordingly, semiconductor memory devices use a method of internally generating a systematic code and transmitting the systematic code to external controllers.

In a systematic code, data output from memory cell arrays becomes original data, and bits obtained by coding the output data of the memory cell arrays become redundant parity bits.

Because the redundant parity bits are generated by logic circuits performing an exclusive OR operation on the original data, a significant latency is required. Accordingly, in semiconductor memory devices which output systematic codes, a read data latency is higher.

SUMMARY

Example embodiments provide a memory device employing a dual clocking method for outputting a systematic code.

Example embodiments provide a systematic code generating method performed by the memory device.

According to an example embodiment, a memory device may include a memory core block, a data patch unit, a Cyclic Redundancy Check (CRC) generating unit, and/or a serializer. The data patch unit may be configured to patch parallel data read from the memory core block in response to a first read pulse. The Cyclic Redundancy Check (CRC) generating unit may be configured to generate a CRC code based on the parallel data in response to a second read pulse, the second read pulse delayed by a period of time from if the first read pulse is generated. The serializer may be configured to convert the parallel data to serial data in response to the first read pulse, and/or arrange the CRC code in an order for a number of bits of the serial data to generate a systematic code.

According to an example embodiment, the systematic code may be output through a data input/output pad of the memory device.

According to an example embodiment, a replica delay unit may generate the second read pulse, and/or the second read pulse may be delayed by a period of time from if the first read pulse is generated to if the CRC code corresponding to the parallel data is generated.

According to an example embodiment, a memory device may include at least a first bank, a first data patch unit, a first Cyclic Redundancy Check (CRC) generator, a second data patch unit, a second CRC generator, a first serializer, and/or a second serializer. The at least a first bank may be divided between at least first and second memory cell array blocks, the first memory cell array block included in a first memory core block and/or the second memory cell array block included in a second memory core block. The first data patch unit may be configured to patch first parallel data read from the first memory core block in response to a first data patch pulse and output the first parallel data as first patch data. The first CRC generator may be configured to generate a plurality of first CRC values based on the first patch data and a plurality of second CRC values. The second data patch unit may be configured to patch second parallel data read from the second memory core block in response to a second data patch pulse and output the second parallel data as second patch data. The second CRC generator may be configured to generate the plurality of second CRC values based on the second patch data and the plurality of first CRC value. The first serializer may be configured to convert the first patch data to first serial data in response to the first data patch pulse, convert the plurality of first CRC values to a plurality of first CRC bits in response to a delayed second data patch pulse, and/or arrange the plurality of first CRC bits in a order for a number of bits of the first serial data to generate a first systematic code. The second serializer may be configured to convert the second patch data to second serial data in response to the second data patch pulse, convert the plurality of second CRC values to a plurality of second CRC bits in response to a delayed first data patch pulse, and/or arrange the plurality of CRC bits in a order for a number of bits of the second serial data to generate a second systematic code.

According to an example embodiment, the memory device may include at least two memory core blocks, a first selection unit, a second selection unit, a first data patch pulse generating unit, and/or a second data patch pulse generating unit. The at least two memory core blocks may include the first memory core block and the second memory core block, each memory core block including at least two banks including the first bank and a second bank which are separated from each other. The first selection unit included in the first memory core block may be configured to select data read from the first bank in response to a first read clock signal and/or select data read from the second bank in response to a second read clock signal. The second selection unit included in the second memory core block may be configured to select the data read from the first bank in response to the first read clock signal and/or select the data read from the second bank in response to the second read clock signal. The first data patch pulse generating unit may be configured to generate, in the first memory core block, the first data patch pulse in response to the first read clock signal and the second read clock signal. The second data patch pulse generating unit may be configured to generate, in the second memory core block, the second data patch pulse in response to the first read clock signal and the second read clock signal.

According to an example embodiment, the delayed second data patch pulse may be a signal delayed by passing the second data patch pulse through a signal path of the second CRC generator.

According to an example embodiment, the delayed first data patch pulse may be a signal delayed by passing the first data patch pulse through a signal path of the first CRC generator.

According to an example embodiment, the memory device may have an Outer Data Inner Command (ODIC) structure.

According to an example embodiment, the first and second serializers may be connected with two data input/output pads of the memory device to output the first and second systematic codes.

According to an example embodiment, a method may include patching parallel data read from a memory core block in response to a first read pulse. A second read pulse delayed by a period of time from if the first read pulse is generated may be generated. The CRC code based on the parallel data may be generated in response to the second read pulse. The parallel data may be converted to serial data in response to the first read pulse, and arranging the CRC code in an order for a number of bits of the serial data to generate a systematic code.

According to an example embodiment, the systematic code may be output through a data input/output pad of the memory device.

According to an example embodiment, a method may include patching first parallel data read from a first memory core block in response to a first data patch pulse and outputting the first parallel data as first patch data, the first memory core block including a first memory cell array block included in at least a first bank divided between the first memory cell array block and a second memory cell array block, the second memory cell array block included in a second memory core block. Second parallel data read from the second memory core block may be patched in response to a second data patch pulse and/or output the second parallel data as second patch data. A plurality of first CRC values may be generated based on the first patch data and a plurality of second CRC values. The plurality of second CRC values may be generated based on the second patch data and the plurality of first CRC values. The first patch data may be converted to first serial data in response to the first data patch pulse, the plurality of first CRC values may be converted to a plurality of first CRC bits in response to a delayed second data patch pulse, and/or the plurality of first CRC bits may be arranged in a order for a number of bits of the first serial data to generate a first systematic code. The second patch data may be converted to second serial data in response to the second data patch pulse, the plurality of second CRC values may be converted to a plurality of second CRC bits in response to a delayed first data patch pulse, and/or the plurality of second CRC bits may be arranged in a order for a number of bits of the second serial data to generate a second systematic code.

According to an example embodiment, the method may include selecting, in the first memory core block, data read from the first bank in response to a first read clock signal, and selecting data read from a second bank in response to a second read clock signal, the first memory core block being one of at least two memory core blocks including the first memory core block and the second memory core block, each memory core block including at least two banks including the first bank and the second bank. In the second memory core block, the data read from the first bank may be selected in response to the first read clock signal and selecting the data read from the second bank in response to the second read clock signal. In the first memory core block, the first data patch pulse may be generated in response to the first read clock signal and the second read clock signal. In the second memory core block, the second data patch pulse may be generated in response to the first read clock signal and the second read clock signal.

According to an example embodiment, the delayed second data patch pulse may be a signal delayed by passing the second data patch pulse through a signal path for generating the plurality of CRC values.

According to an example embodiment, the delayed first data patch pulse may be a signal delayed by passing the first data patch pulse through a signal path for generating the plurality of first CRC values.

According to an example embodiment, the first and second systematic codes may be output through two data input/output pads of the memory device.

Accordingly, in a memory device according to an example embodiment, if a systematic code is output, a clock signal for original data and a clock signal for redundant parity bits may be separately used. The clock signal for redundant parity bits may be generated using a second data patch pulse delayed by passing a second data patch pulse through a signal path of a second CRC generator, and/or a first data patch pulse delayed by passing a first data patch pulse through a signal path of a first CRC generator. Accordingly, by outputting original data in series in response to the first data patch pulse and outputting CRC bits in response to delayed second data patch pulse, a first systematic code may be generated. By outputting the original data in series in response to the second data patch pulse and outputting the CRC bits in response to the delayed first data patch pulses, a second systematic code may be generated. Therefore, a read data latency may be reduced.

BRIEF DESCRIPTION OF THE DRAWINGS

The above and/or other aspects and advantages will become more apparent and more readily appreciated from the following detailed description of example embodiments taken in conjunction with the accompanying drawings of which.

DETAILED DESCRIPTION OF EXAMPLE EMBODIMENTS

Figure 1:
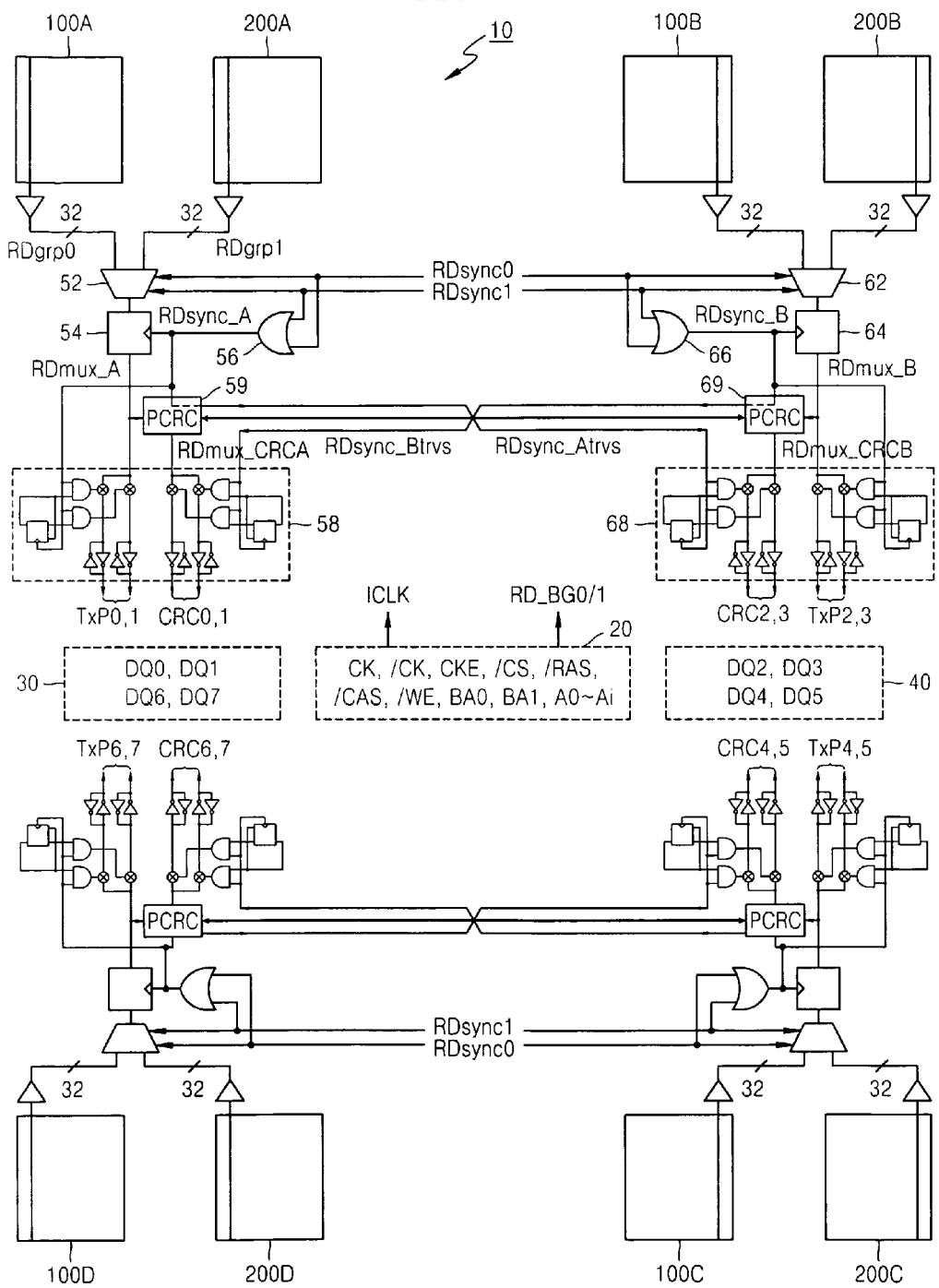
FIG. 1 is a circuit diagram of a memory device according to an example embodiment.

Example embodiments will now be described more fully hereinafter with reference to the accompanying drawings. Embodiments may, however, be in many different forms and should not be construed as being limited to the example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when a component is referred to as being "on," "connected to" or "coupled to" another component, it can be directly on, connected to or coupled to the other component or intervening components may be present. In contrast, when a component is referred to as being "directly on," "directly connected to" or "directly coupled to" another component, there are no intervening components present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

Spatially relative terms, such as "beneath," "below," "lower," "above," "upper" and the like, may be used herein for ease of description to describe one component or feature's relationship to another component(s) or feature(s) as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

FIG. 1 is a circuit diagram of a memory device 10 according to an example embodiment.

The memory device 10 illustrated in FIG. 1 is described with respect to a systematic code generating method in which 1 Cyclic Redundancy Check (CRC) bit is output for 8 bits of original data. However, example embodiments are not limited thereto, and a systematic code generating method in which n CRC bits are output for m bits of original data may be used.

Referring to FIG. 1, the memory device 10 may include a plurality of banks. A first bank may include memory cell array blocks 100A through 100D that are separated from each other. A second bank may include memory cell blocks 200A through 200D that are separated from each other. The first banks 100A through 100D may output first bank data RDgrp0, in response to a first read command RD_BG0 which is synchronized with an internal clock signal ICLK. The second banks 200A through 200D may output second bank data RDgrp1, in response to a second read command RD_BG1 which is synchronized with the internal clock signal ICLK. Each first bank may read data through a plurality of data lines, for example, 32 data lines. Each second bank may read data through a plurality of data lines, for example, 32 data lines. Accordingly, 128 bits may be assigned to each of the first bank data RDgrp0 and the second bank data RDgrp1. However, example embodiments are not limited thereto, and each first and second bank may read data through any number of data lines.

The internal clock signal ICLK may be generated by a delay synchronization circuit DLL (not shown) which receives external clock signals CK and /CK through clock signal input terminals. A delay locked loop circuit DLL (not shown) may synchronize the phases of the external clock signals CK and /CK with the phase of the internal clock signal ICLK. First and second bank read commands RD_BG0 and RD_BG1 may be generated by logic circuits configured to couple control signals applied to external control signal input terminals CKE, /CS, /RAS, /CAS, and /WE with address signals received through address signal input terminals BA0, BA1, and A0-Ai.

The memory device 10 may include an Outer Data Inner Command (ODIC) structure in which an area 20 including the clock signal input terminals CK and /CK, the external control signal input terminals CKE, /CS, /RAS, /CAS, and /WE, and/or the address signal input terminals BA0, BA1, and A0-Ai may be disposed in a center part of the memory device 10. The memory device 10 may include an area 30 including data input/output pads DQ0, DQ1, DQ6, and/or DQ7 and/or an area 40 including data input/output pads DQ2, DQ3, DQ4, and/or DQ5, which may be disposed around the area 20.

For convenience of description, a method for generating systematic codes associated with data which is read from the first banks 100A and 100B and the second banks 200A and 200B disposed above the ODIC structure, will be described below. An area in which the first bank 100A and the second bank 200A are disposed is referred to as a first memory core block, and an area in which the first bank 100B and the second bank 200B are disposed is referred to as a second memory core block. A method for generating systematic codes associated with data which is read from the first banks 100C and 100D and the second banks 200C and 200D disposed below the ODIC structure may be the same as for the first banks 100A and 100B and the second banks 200A and 200B disposed above the structure, and therefore, a description thereof is omitted.

In the first memory core block, data RDgrp0 of the first bank 100A may be transferred to a first data patch unit 54 through a first selection unit 52, in response to a first read clock signal RDsync0. Data RDgrp1 of the second bank 200A may be transferred to the first data patch unit 54 through the first selection unit 52, in response to a second read clock signal RDsync1. The first data patch pulse generator 56 may receive the first read clock signal RDsync0 and the second read clock signal RDsync1, and generate a first data patch pulse RDsync_A. The first data patch pulse generator 56 may be an OR gate for performing an OR logic operation on the first read clock signal RDsync0 and the second read clock signal RDsync1.

The first data patch unit 54 may patch the first and second bank data RDgrp0 and RDgrp1 which are transferred from the first selection unit 52, in response to the first data patch pulse RDsync_A, and output first patch data RDmux_A. The first patch data RDmux_A may be transferred to a first serializer 58 and/or a first CRC generator 59.

The first serializer 58 may arrange the first patch data RDmux_A in a desired, or alternatively, a predetermined order, in response to the first data patch pulse RDsync_A, and output the resultant first patch data RDmux_A to first and second transfer lines TxP0 and TxP1. The first CRC generator 59 may calculate the first patch data RDmux_A and second CRC values generated by a second CRC generator 69, and generate first CRC values RDmux_CRCA. The first serializer 58 may arrange the first CRC values RDmux_CRCA in a desired, or alternatively, a predetermined order, in response to the second data patch pulse Rdsync_B, and output first and second CRC bits CRC0 and CRC1.

The first CRC bit CRC0 and serial data of the first transfer line TxP0 may be output through the first data input/output pad DQ0, and/or the second CRC bit CRC1 and serial data of the second transfer line TxP1 may be output through the second data input/output pad DQ1.

In the second memory core block, data of the first bank 100B may be transferred to the second data patch unit 64 through the second selection unit 62, in response to the first read clock signal RDsync0. Data of the second bank 200B may be transferred to the second data patch unit 64 through the second selection unit 62, in response to the second read clock signal RDsync1. The second data patch pulse generating unit 66 may receive the first read clock signal RDsync0 and the second read clock signal RDsync1, and generate the second data patch pulse Rdsync_B. The second data patch pulse generator 66 may be an OR logic gate for performing an OR logic operation on the first read clock signal RDsync0 and the second read clock signal RDsync1.

The second data patch unit 64 may patch data of the first and second banks 100B and 200B which are transferred through the second selection unit 62, in response to the second data patch pulse RDsync_B, and output the second patch data RDmux_B. The second patch data Rdmux_B may be transferred to the second serializer 68 and/or the second CRC generator 69.

The second serializer 68 may arrange the second patch data RDmux_B in a desired, or alternatively, a predetermined order, in response to the second data patch pulse RDsync_B, and output the resultant second patch data RDmux_B to third and fourth transfer lines TxP2 and TxP3. The second CRC generator 69 may generate the second CRC values RDmux_CRCB using the second patch data RDmux_B and the first CRC values generated by the first CRC generator 59. The second serializer 68 may arrange the second CRC values RDmux_CRCB in a desired, or alternatively, a predetermined order, in response to the first data patch pulse RDsync_A, and output the second CRC values RDmux_CRCB to third and fourth CRC bits CRC2 and CRC3.

The third CRC bit CRC2 and serial data of the third transfer line TxP2 may be output through the third data input/output pad DQ2, and/or the fourth CRC bit CRC3 and serial data of the fourth transfer line TxP3 may be output through the fourth data input/output pad DQ3. A method for generating systematic codes associated with data which is read from the first banks 100C and 100D and the second banks 200C and 200D disposed below the ODIC structure may similarly use the transfer lines TXP4-7 and the output pads DQ4-DQ7 to output the systematic code associated therewith, e.g., CRC bits CRC0 to CRC7 and the serial data associated therewith.

Figure 2:
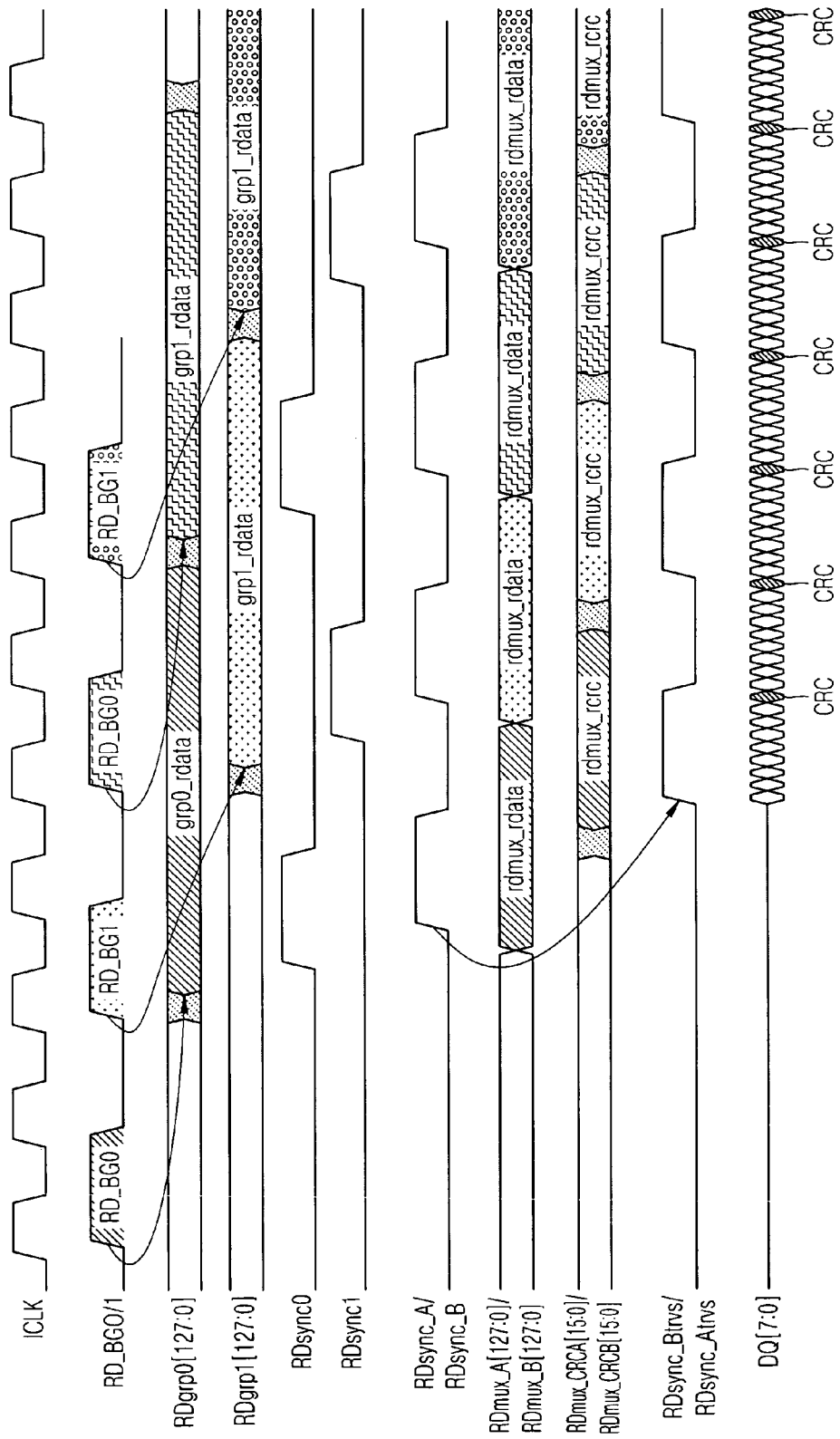
FIG. 2 is an example timing diagram illustrating an operation of the memory device illustrated in FIG. 1.

FIG. 2 is an example timing diagram illustrating an operation of the memory device 10. Referring to FIGS. 1 and 2, a first read command RD_BG0 and a second read command RD_BG1 may be sequentially received in response to an internal clock signal ICLK. 128 bits of first bank data RDgrp0 may be output from the first banks 100A through 100D in response to the first read command RD_BG0, and/or 128 bits of second bank data RDgrp1 may be output from the second banks 200A through 200D in response to the second read command RD_BG1.

A first read clock signal RDsyn0 corresponding to the first bank data RDgrp0 may be generated, and/or a second read clock signal RDsync1 corresponding to the second bank data RDgrp1 may be generated. An OR logic operation may be performed on the first read clock signal RDsync0 and/or the second read clock signal RDsync1 to generate a first data patch pulse RDsync_A. The first bank data RDgrp0 and the second bank data RDgrp1 may be patched in response to the first data patch pulse RDsync_A to generate first patch data RDmux_A. An OR logic operation may be performed on the first read clock signal RDsync0 and the second read clock signal RDsync1 to generate a second data patch pulse RDsync_B. Second patch data RDmux_B may be generated in response to the second data patch pulse RDsync_B.

The first patch data RDmux_A and the second CRC values RDmux_CRCB generated by the second CRC generator 69 may be used to generate first CRC values RDmux_CRCA. The second patch data RDmux_B and the first CRC values RDmux_CRCA generated by the first CRC generator 59 may be used to generate second CRC values RDmux_CRCB.

The second data patch pulse RDsync_B may pass through a signal path of the second CRC generator 69 to generate a delayed second data patch pulse RDsync_Btrvs. The first data patch pulse RDsync_A may pass through a signal path of the first CRC generator 59 to generate a delayed first data patch pulse RDsync_Atrvs.

The first serializer 58 may arrange the first patch data RDmux_A in a desired, or alternatively, a predetermined order, in response to the first data patch pulse RDsync_A, and/or arrange the first CRC values in a desired, or alternatively, a predetermined order, in response to the delayed second data patch pulse RDsync_Btrvs to output the first CRC bits CRC0 and CRC1, for each 8 bits of the first patch data RDmux_A, to the first and second data input/output pads DQ0 and DQ1. The second serializer 68 may arrange the second patch data RDmux_B in a desired, or alternatively, a predetermined order, in response to the second data patch signal Rdsync_B, and/or arrange the second CRC values in a desired, or alternatively, a predetermined order, in response to the delayed first data patch pulse RDsync_Btrvs to output the second CRC bits CRC2 and CRC3, for each 8 bits of the first patch data RDmux_B, to the third and fourth data input/output pads DQ2 and DQ3. Likewise, CRC bits CRC4 through CRC7 may be output for each 8 bits of patch data to the fifth through eighth data input/output pads DQ4 through DQ7. For example, CRC bits CRC4 through CRC7 may be associated with data which is read from the first banks 100C and 100D and the second banks 200C and 200D disposed below the ODIC structure.

Accordingly, the 128 bits of first bank data RDgrp0 may pass through the first through eighth data input/output pads DQ0 through DQ7 to generate systematic codes in each of which 1 CRC bit is assigned to each 8 bits of data. For example, the 128 bits of first bank data RDgrp0 may be assigned 16 CRC bits.

The memory device 10 may output 8 bits of original data in series in response to the first data patch pulse RDsync_A, and/or outputs 1 CRC bit in response to the delayed second data patch pulse RDsync_Btrvs, thereby generating a first systematic code. The memory device 10 may output 8 bits of original data in series in response to the second data patch pulse RDsync_B, and/or output 1 CRC bit in response to the delayed first data patch pulse RDsync_Atrvs, thereby generating a second systematic code. Accordingly, in the memory device 100 according to an example embodiment, because a clock signal for original data and a clock signal for parity bits are separately used if a systematic code is generated, a read data latency may be reduced.

Although example embodiments have been shown and described in this specification and figures, it would be appreciated by those skilled in the art that changes may be made to the illustrated and/or described example embodiments without departing from their principles and spirit.

What is claimed is:
1. A memory device, comprising:
  a memory core block;

a data patch unit configured to patch parallel data read from the memory core block in response to a first read pulse;

a Cyclic Redundancy Check (CRC) generating unit configured to generate a CRC code based on the parallel data in response to a second read pulse, the second read pulse delayed by a period of time from if the first read pulse is generated; and a serializer configured to convert the parallel data to serial data in response to the first read pulse, and arrange the CRC code in a order for a number of bits of the serial data to generate a systematic code.

2. The memory device of claim 1, wherein the systematic code is output through a data input/output pad of the memory device.

3. A memory device, comprising:

at least a first bank divided between at least first and second memory cell array blocks, the first memory cell array block included in a first memory core block and the second memory cell array block included in a second memory core block;

a first data patch unit configured to patch first parallel data read from the first memory core block in response to a first data patch pulse and output the first parallel data as first patch data;

a first Cyclic Redundancy Check (CRC) generator configured to generate a plurality of first CRC values based on the first patch data and a plurality of second CRC values;

a second data patch unit configured to patch second parallel data read from the second memory core block in response to a second data patch pulse and output the second parallel data as second patch data;

a second CRC generator configured to generate the plurality of second CRC values based on the second patch data and the plurality of first CRC values;

a first serializer configured to convert the first patch data to first serial data in response to the first data patch pulse, convert the plurality of first CRC values to a plurality of first CRC bits in response to a delayed second data patch pulse, and arrange the plurality of first CRC bits in a order for a number of bits of the first serial data to generate a first systematic code; and a second serializer configured to convert the second patch data to second serial data in response to the second data patch pulse, convert the plurality of second CRC values to a plurality of second CRC bits in response to a delayed first data patch pulse, and arrange the plurality of CRC bits in a order for a number of bits of the second serial data to generate a second systematic code.

4. The memory device of claim 3, wherein the delayed second data patch pulse is a signal delayed by passing the second data patch pulse through a signal path of the second CRC generator.

5. The memory device of claim 3, wherein the delayed first data patch pulse is a signal delayed by passing the first data patch pulse through a signal path of the first CRC generator.

6. The memory device of claim 3, wherein the memory device has an Outer Data Inner Command (ODIC) structure.

7. The memory device of claim 3, wherein the first and second serializers are each connected to a data input/output pad of the memory device to output the first and second systematic codes.

8. The memory device of claim 3, further comprising:

at least two memory core blocks including the first memory core block and the second memory core block, each memory core block including at least two banks including the first bank and a second bank which are separated from each other;

a first selection unit included in the first memory core block configured to select data read from the first bank in response to a first read clock signal and select data read from the second bank in response to a second read clock signal;

a second selection unit included in the second memory core block configured to select the data read from the first bank in response to the first read clock signal and select the data read from the second bank in response to the second read clock signal;

a first data patch pulse generating unit configured to generate, in the first memory core block, the first data patch pulse in response to the first read clock signal and the second read clock signal;

a second data patch pulse generating unit configured to generate, in the second memory core block, the second data patch pulse in response to the first read clock signal and the second read clock signal.

9. The memory device of claim 8, wherein the delayed second data patch pulse is a signal delayed by passing the second data patch pulse through a signal path of the second CRC generator.

10. The memory device of claim 8, wherein the delayed first data patch pulse is a signal delayed by passing the first data patch pulse through a signal path of the first CRC generator.

11. The memory device of claim 8, wherein the memory device has an Outer Data Inner Command (ODIC) structure.

12. The memory device of claim 8, wherein the first and second serializers are connected with two data input/output pads of the memory device to output the first and second systematic codes.

13. A method, comprising:

patching parallel data read from a memory core block in response to a first read pulse;

generating a second read pulse delayed by a period of time from if the first read pulse is generated;

generating the CRC code based on the parallel data in response to the second read pulse; and converting the parallel data to serial data in response to the first read pulse, and arranging the CRC code in a order for a number of bits of the serial data to generate a systematic code.

14. The method of claim 13, wherein the systematic code is output through a data input/output pad of the memory device.

15. A method, comprising:

patching first parallel data read from a first memory core block in response to a first data patch pulse and outputting the first parallel data as first patch data, the first memory core block including a first memory cell array block included in at least a first bank divided between the first memory cell array block and a second memory cell array block, the second memory cell array block included in a second memory core block;

patching second parallel data read from the second memory core block in response to a second data patch pulse and outputting the second parallel data as second patch data;

generating a plurality of first CRC values based on the first patch data and a plurality of second CRC values;

generating the plurality of second CRC values based on the second patch data and the plurality of first CRC values;

converting the first patch data to first serial data in response to the first data patch pulse, converting the plurality of first CRC values to a plurality of first CRC bits in response to a delayed second data patch pulse, arranging the plurality of first CRC bits in a order for a number of bits of the first serial data to generate a first systematic code; and converting the second patch data to second serial data in response to the second data patch pulse, converting the plurality of second CRC values to a plurality of second CRC bits in response to a delayed first data patch pulse, and arranging the plurality of second CRC bits in a order for a number of bits of the second serial data to generate a second systematic code.

16. The method of claim 15, wherein the delayed second data patch pulse is a signal delayed by passing the second data patch pulse through a signal path for generating the plurality of second CRC values.

17. The method of claim 15, wherein the delayed first data patch pulse is a signal delayed by passing the first data patch pulse through a signal path for generating the plurality of first CRC values.

18. The method of claim 15, wherein the first and second systematic codes are respectively output to two data input/output pads of the memory device.

19. The method of claim 15, further comprising:

selecting, in the first memory core block, data read from the first bank in response to a first read clock signal, and selecting data read from a second bank in response to a second read clock signal, the first memory core block being one of at least two memory core blocks including the first memory core block and the second memory core block, each memory core block including at least two banks including the first bank and the second bank;

selecting, in the second memory core block, the data read from the first bank in response to the first read clock signal and selecting the data read from the second bank in response to the second read clock signal;

generating, in the first memory core block, the first data patch pulse in response to the first read clock signal and the second read clock signal;

generating, in the second memory core block, the second data patch pulse, in response to the first read clock signal and the second read clock signal.

20. The method of claim 19, wherein the delayed second data patch pulse is a signal delayed by passing the second data patch pulse through a signal path for generating the plurality of CRC values.

21. The method of claim 19, wherein the delayed first data patch pulse is a signal delayed by passing the first data patch pulse through a signal path for generating the plurality of first CRC values.

22. The method of claim 19, wherein the first and second systematic codes are output through two data input/output pads of the memory device.

* * * * *